US011112802B2

(12) United States Patent
Aberle et al.

(10) Patent No.: US 11,112,802 B2
(45) Date of Patent: Sep. 7, 2021

(54) ENHANCED AUTOMATED STEERING SYSTEM FOR A VEHICLE

(71) Applicant: 360 Yield Center, LLC, Morton, IL (US)

(72) Inventors: Reid J. Aberle, Morton, IL (US); Jonathan T. Welte, Delavan, IL (US); Timothy Sauder, Morton, IL (US)

(73) Assignee: 360 Yield Center, LLC, Morton, IL (US)

( * ) Notice: Subject to any disclaimer, the term of this patent is extended or adjusted under 35 U.S.C. 154(b) by 0 days.

(21) Appl. No.: 16/016,336

(22) Filed: Jun. 22, 2018

(65) Prior Publication Data

US 2018/0373259 A1 Dec. 27, 2018

Related U.S. Application Data

(60) Provisional application No. 62/617,437, filed on Jan. 15, 2018, provisional application No. 62/523,766, filed on Jun. 22, 2017.

(51) Int. Cl.
*G05D 1/02* (2020.01)
*B62D 1/28* (2006.01)
(Continued)

(52) U.S. Cl.
CPC ......... *G05D 1/0227* (2013.01); *A01B 61/044* (2013.01); *A01B 69/008* (2013.01);
(Continued)

(58) Field of Classification Search
CPC .............. G05D 1/0227; G05D 1/0278; G05D 2201/0201; G05D 1/02; G05D 3/12;
(Continued)

(56) References Cited

U.S. PATENT DOCUMENTS 8,766,752 B2 * 7/2014 Mercer ................... F16D 21/02
310/80
9,559,410 B2 * 1/2017 Grodahl ............... H01Q 1/3275
(Continued)

FOREIGN PATENT DOCUMENTS

WO WO2018017995 * 1/2018

*Primary Examiner* — Jeffrey C Boomer
*Assistant Examiner* — Annmarie Irwin
(74) *Attorney, Agent, or Firm* — Thomas J. Oppold; Larkin Hoffman Daly & Lindgren Ltd.

(57) ABSTRACT

An automated steering system for an agricultural vehicle operating in a row crop field. The automated steering system includes a correction system having a controller and an alignment sensor. The alignment sensor is disposed between two adjacently spaced crop rows and generates output signals indicative of the alignment sensor's lateral position relative to the two adjacently spaced crop rows as the vehicle advances in the forward direction of travel. The controller receives the generated output signals from the alignment sensor and determines an offset distance of said alignment sensor from a centerline between the two adjacently spaced crop rows. The controller outputs a modified vehicle position signal corresponding to the latitude and longitude position received from said GPS receiver shifted by the offset distance. The vehicle's on board navigation controller causes the vehicles on-board steering control system to steer the vehicle based on the modified vehicle position signal.

4 Claims, 13 Drawing Sheets

(51) Int. Cl.
*G01D 5/14* (2006.01)
*A01B 69/04* (2006.01)
*A01C 23/00* (2006.01)
*A01B 61/04* (2006.01)

(52) U.S. Cl.
CPC .............. *A01C 23/006* (2013.01); *B62D 1/28* (2013.01); *G01D 5/145* (2013.01); *G05D 1/0278* (2013.01); *A01C 23/005* (2013.01); *G05D 2201/0201* (2013.01)

(58) Field of Classification Search
CPC ..... G01D 5/20; G01D 5/145; B60W 2422/90; B60W 2420/503; B60G 2401/172; A01B 69/008; A01B 61/044; B62D 1/28; A01C 23/006; A01C 23/005
See application file for complete search history.

(56) References Cited

U.S. PATENT DOCUMENTS

| | | | |
|---|---|---|---|
| 9,921,064 B2 * | 3/2018 | Schleicher | A01B 69/008 |
| 10,413,923 B2 | 9/2019 | Ritland et al. | |
| 2015/0334920 A1 * | 11/2015 | Schleicher | A01D 75/00 |
| | | | 701/41 |
| 2016/0174454 A1 * | 6/2016 | Phan | A01B 69/008 |
| | | | 701/301 |
| 2018/0317372 A1 * | 11/2018 | Schleicher | A01B 79/005 |

\* cited by examiner

ENHANCED AUTOMATED STEERING SYSTEM FOR A VEHICLE

CROSS-REFERENCE TO RELATED APPLICATIONS

This application claims the benefit of U.S. Provisional Application No. 62/523,766, filed Jun. 22, 2017, and U.S. Provisional Application No. 62/617,437, filed Jan. 15, 2018, each of which is incorporated herein in its entirety.

BACKGROUND

Certain agricultural field operations require precise control of the agricultural vehicles and implements. One such field operation where precise control is necessary is the application of fertilizers to fields with established row crops. Despite the risk of inadvertently running over and damaging the established crops, growers perform these field operations because it has been shown that applying specific crop nutrients at different times ranging from the early vegetative stages of a plant's life to the middle reproductive stages of the plant's life can result in higher yields and more efficient use of fertilizer, thereby reducing surface contamination.

To avoid running over and damaging the standing row crops during such field operations, the wheels of the agricultural vehicle must stay between the crop rows as the vehicle advances through the field. However, when the crop canopy obscures the soil between crop rows, it can be difficult for the operator to manually keep the vehicle wheels precisely between the crop rows to avoid running over the crop. Consequently, growers have come to rely on global positioning systems (GPS) and automated steering systems for operating agricultural vehicles for many field operations.

However, even with fields planted using RTK (Real Time Kinematic) GPS systems, row spacing between subsequent passes of the planter can vary because planters can sway or drift, especially when planting on slopes or hills. And when planting using sub-RTK accuracy, there can be even greater deviations between row spacing of adjacent planter passes. If deviations in row spacing are not taken into account, any drift or offset of the vehicle operating in the standing row crops can result in the vehicle wheels running over some of the plants. Thus, there is a need for enhanced automated steering systems to improve steering precision when operating in fields of standing row crops.

DESCRIPTION

Figure 1:
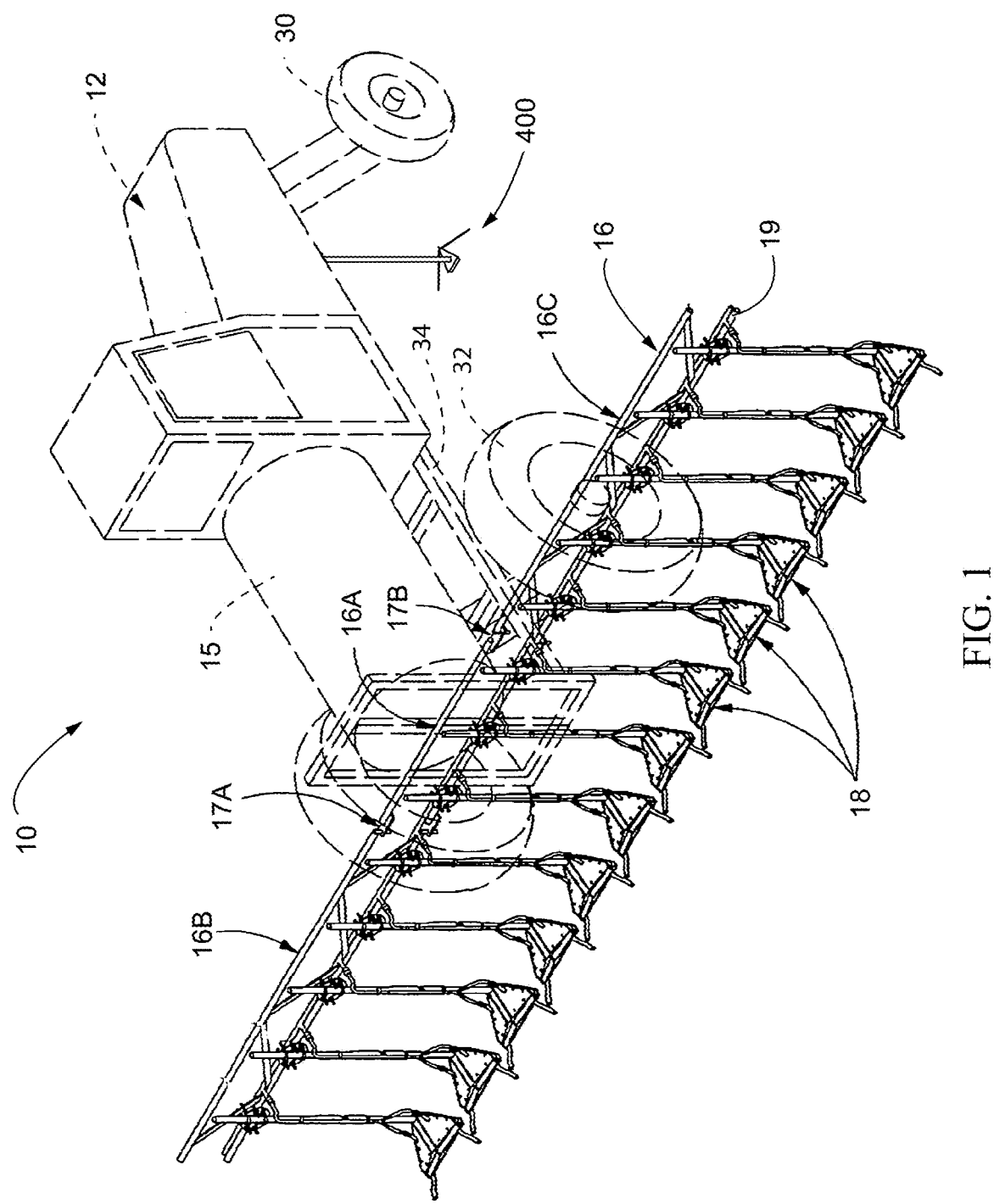
FIG. 1 is a perspective view of an embodiment of a liquid applicator implement.

Referring now to the drawings wherein like reference numerals designate the same or corresponding parts throughout the several views, FIG. 1 is a perspective view of an illustrative embodiment of liquid applicator implement 10, such as disclosed in U.S. Patent Publication No. US2017/0049043 (the '043 Publication), incorporated herein by reference in its entirety. The liquid applicator implement 10 includes a vehicle 12 carrying a liquid storage tank 15 and a boom 16 along which a plurality of drop assemblies 18 are laterally spaced. It should be appreciated that the term "drop assemblies" as used herein refers to any structure that extends below the boom 16 for delivering liquid product to the crops, or to the soil. It should also be appreciated that while the liquid applicator implement 10 is depicted as a self-propelled implement in FIG. 1, the liquid applicator implement 10 may be attached to a tractor via a three point hitch (not shown) or the liquid applicator implement 10 may be a towed implement that is pulled behind a tractor (not shown).

One or more distribution hoses 19 communicate liquid product from the liquid storage tank 15 on the vehicle to each of the drop assemblies 18 disposed along the boom 16. Any type and number of suitable distribution hoses 19 may be utilized and any type of suitable pumping mechanism (not shown) may be employed to communicate the liquid product from the tank 15 to the distribution hoses 19, and thereby, to the drop assemblies 18.

The boom 16 may be of any desired length, such as 60 feet, 90 feet, and 100 feet lengths, as non-limiting examples. The boom 16 may also have any suitable structural configuration, such as a single beam, multiple beams, truss configurations, or combinations thereof. Additionally, rather than the boom 16 being mounted at the rear of the vehicle 12 as shown in FIG. 1, the boom 16 may be attached at front of the vehicle 12.

The boom 16 may be mounted to the vehicle 12 in such a way as to be vertically adjustable with respect to the vehicle 12 and the ground surface. The boom 16 may also be configured to allow sections of the boom to be folded upwardly and/or rearwardly. For example, as illustrated in FIG. 1, the boom 16 may include a center section 16A, that is mounted to the vehicle 12, and with wing sections 16B and 16C on either side of the center section 16A connected at respective joints 17A, 17B. The center section 16A and wing sections 16B, 16C may be vertically adjustable as a unit with respect to the vehicle or the center section 16A and wing sections 16B, 16C may be independently vertically adjustable with respect to each other and the vehicle 12. Each wing section 16A, 16B may pivot rearwardly with respect to the center section 16A about the respective joints 17A, 17B. Alternatively, the joints 17A, 17B may be oriented and configured to allow the respective wing sections 16A, 16B to pivot upwardly with respect to the center section 16A. Having foldable boom sections allows for space-efficient storing of the implement 10 and for easier transport when traveling between fields. Additionally, foldable boom sections, permits the wing sections 16B, 16C to be moved to avoid injuring or damaging standing crops when turning at the ends of the field. It should be appreciated that the boom 16 may have any number of sections such as one, two, four, five or more sections as desired with corresponding joints between sections.

Figure 2:
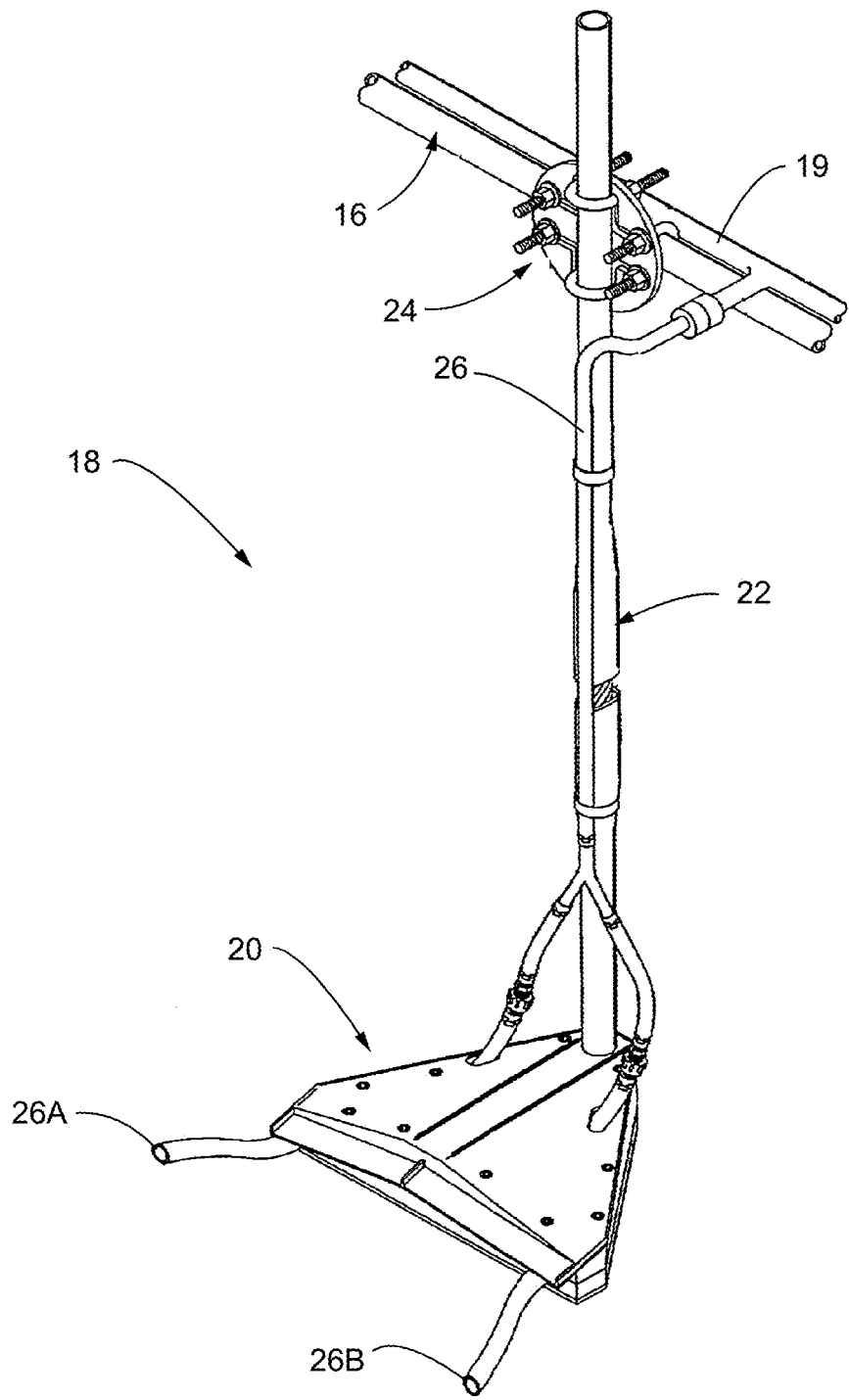
FIG. 2 is an enlarged perspective view of an embodiment of one of the drop assemblies of the liquid applicator implement of FIG. 1.

FIG. 2 is an enlarged perspective view of an embodiment of one of the drop assemblies 18. In this embodiment, the drop assembly includes a base unit 20 that is supported at a lower end of a riser 22 which is supported from and extends below the boom 16. The risers 22 may be rigid or flexible such that the riser may bend or flex. The drop assembly 18 includes a drop hose 26 that connects to the distribution hose 19. The drop hose 26 may split into separate lines toward the base unit 20 and the lines may diverge outwardly and rearwardly terminating into two or more laterally spaced dribble hoses 26A, 26B. As disclosed in the '043 Publication, the riser 22 may support one or more spray nozzles (not shown) for spraying liquid product onto the crops in one or more directions while the dribble hoses 26A, 26B dribble liquid product as a low pressure continuous stream directly onto the soil adjacent to the crop rows over the rhizosphere of the plants.

The drop assemblies 18 may be coupled to the boom 16 using any suitable mounting mechanism 24 to allow the drop assemblies 18 to be adjustably, laterally spaced between the crop rows according to the row spacing at with the crops are planted which may vary from 15 to 48 inch spacings. Additionally, the drop assemblies 18 may be mounted using any suitable mounting mechanism 24 to allow the riser 22 and thus the drop assemblies 18 to be vertically adjustable with respect to the boom 16 to vary the distance the drop assemblies 18 extend below the boom 16. Various mounting mechanisms 24 for coupling the drop assemblies 18 to the boom 16 are disclosed in the '043 Publication, previously incorporated by reference. The mounting mechanism 24 for coupling the drop assemblies 18 to the boom 16 may also comprise a break-away mounting mechanism such as disclosed in U.S. Publication No. US2017/0118908, which is incorporated herein by reference in its entirety, configured to allow the drop assemblies 18 to deflect or pivot rearwardly from a normal, substantially vertical, operating orientation upon encountering an obstruction in the field as the vehicle 12 advances in the forward direction of travel and to return again from the deflected position to the normal substantially vertical operating orientation when the drop assembly passes the obstruction.

It should be appreciated that when operating the liquid applicator implement 10 in standing crops, and especially when the crop canopy obscures the soil between the crop rows, it can be difficult for the operator to keep the wheels 30, 32 of the vehicle 12 properly aligned between the crop rows to prevent damage to the crop. Accordingly, to ensure proper alignment of the vehicle wheels 30, 32 between the crop rows, an automated enhanced steering system 700 is utilized.

Referring now to FIGS. 3-6, an embodiment of an automated enhanced steering system 700 is illustrated which utilizes a correction system 704 to adjust the GPS data guiding the vehicle 12 along a target path based on measurements of an alignment sensor 400 disposed between crop row to detect whether the vehicle is out of alignment with respect to the centerline between the crop rows. The alignment sensors 400 communication with a controller 710. The controller 710 cooperates with the vehicle's on-board steering system 702. In one embodiment, the alignment sensors 400 may be a tactile sensor 400A as described in more detail below. In other embodiments, the alignment sensors 400 may be non-contact sensors 400B (not shown), such as optical sensors, cameras, radar, ultrasonic sensors, thermal sensors, reflectivity sensors, etc. In some embodiments, both tactile sensors 400A and non-contactor sensors 400B may be utilized together.

In FIGS. 1 and 3-5, the alignment sensor 400 is shown as a tactile sensor 400A attached to the vehicle 12 in order to measure a position relative to two adjacent crop rows or the alignment with the adjacent rows. The tactile sensor 400A includes a mounting bracket 402 which may be rigidly attachment to the vehicle 12 at any desired location. Alternatively, a break-away mounting assembly 400 (discussed later) may be utilized for attaching the alignment sensor 400 to the vehicle 12. It should be appreciated that the desired mounting location on the vehicle 12 may include a longitudinal centerline of the vehicle, or other alignment point (e.g., a bracket directly in front of a wheel). A supporting rod 404 is supported from the vehicle 12 by the bracket 402 (or by the breakaway mounting assembly 400 if used). A sensor housing 406 is supported at the end of the supporting rod 404. One end of a first wand or tactile feeler 410 and one end of a second wand or tactile feeler 412 are coupled to the housing 406. First and second position sensors 414, 416 (FIG. 4) are disposed within the housing 406 which shields the positions sensors from damage as the alignment sensor 400A passes through the field.

Figure 3:
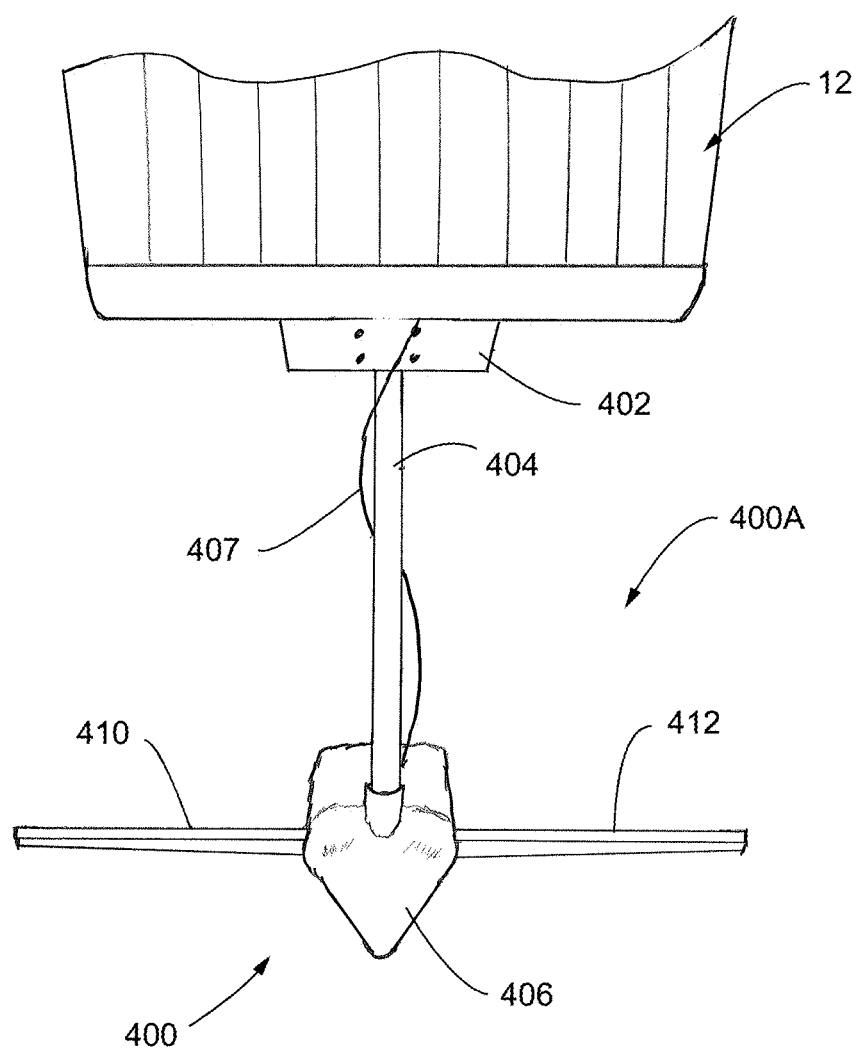
FIG. 3 is a front perspective view of an alignment sensor.
Figure 4:
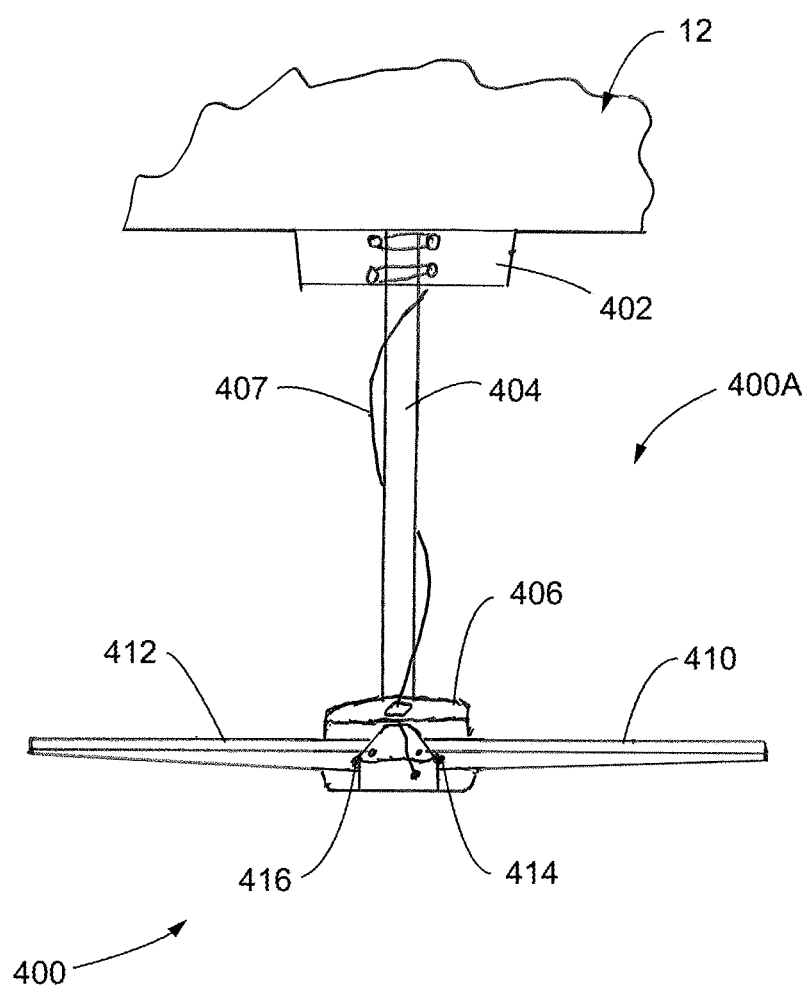
FIG. 4 is a rear perspective view of the alignment sensor of FIG. 3.
Figure 5:
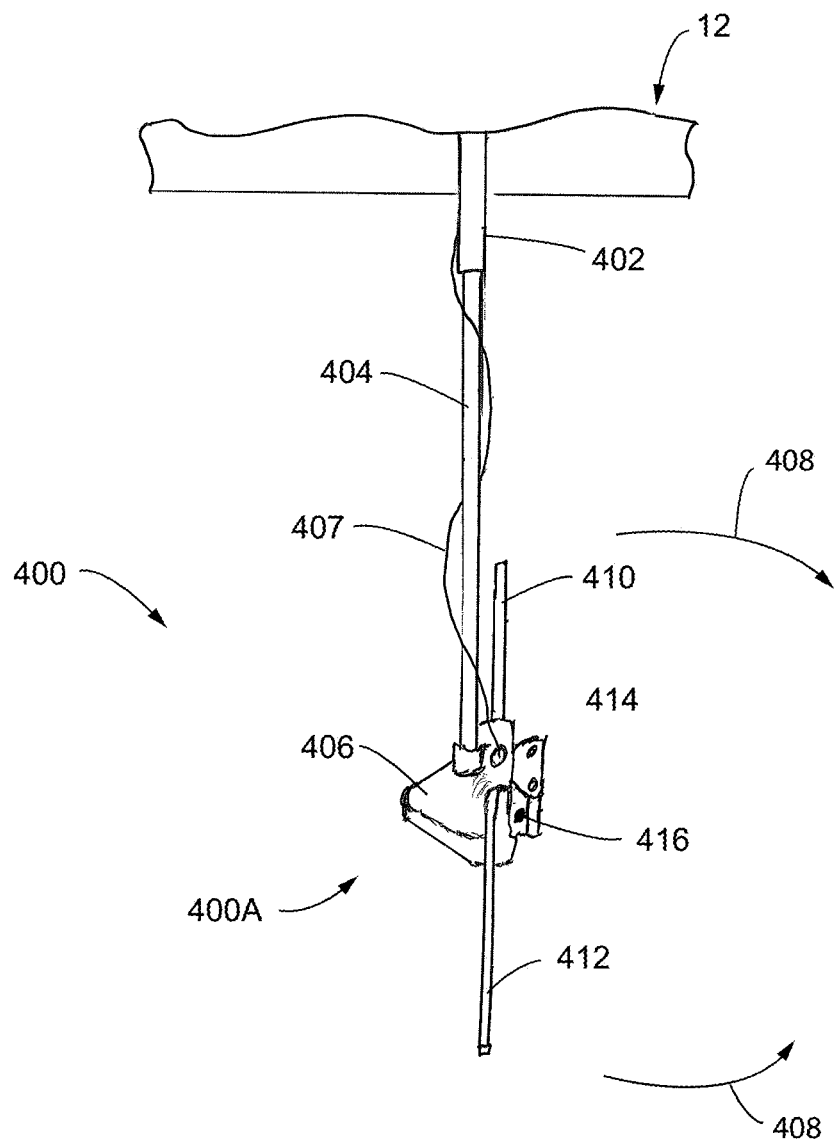
FIG. 5 is a side perspective view of the alignment sensor of FIG. 4.

Each wand 410, 412 will deflect, displace or rotate with respect to the housing 406 as the wands engage with the standing crop. A biasing mechanism (not shown) may be provided to urge the wands 410, 412 to a home position. In FIGS. 3-5, both the first wand 410 and the second wand 412 are shown positioned in the home position. The first position sensor 414 and the second position sensor 416 measure or detect the amount of deflection, displacement or rotation of the respective wands 410, 412, at any point in time which is indicative of the position of first wand 410 and second wand 412 and which correlates to the measurement or the distance the tactile sensor 400A is offset from the midpoint or centerline between rows. The output signals from the position sensors 414, 416 are communicated via a signal wire 407 to the vehicle's on board steering system 702 or other vehicle components. Alternatively, the output signals may be communicated to the related systems of the vehicle 12 via radio frequency or other suitable signal or data communication means. Thus, it should be appreciated that the first position sensor 414 and the second position sensor 416 continuously detect the relative position of the first wand 410 and second wand 412, respectively. In one embodiment, the first position sensor 414 and the second position sensor 416 may comprise a Hall-effect sensor mounted to the housing 406, and a cooperating magnet carried by the corresponding first and second wands 410, 412.

The first wand 410 and the second wand 412 may be formed from a polyurethane material and are intended to contact the crop (e.g., the crop stalks) on each side of the crop row as the vehicle advances through the field during operation. As the tactile sensor 400A gets closer to one side (i.e. closer to one of the crop rows), the more the wand 410, 412 on that side will deflect, displace or rotate rearwardly as indicated by arrow 408 (FIG. 5) from its home position, thus creating more deflection and an increase in the output signal magnitudes of the related position sensor 414, 416.

Figure 6:
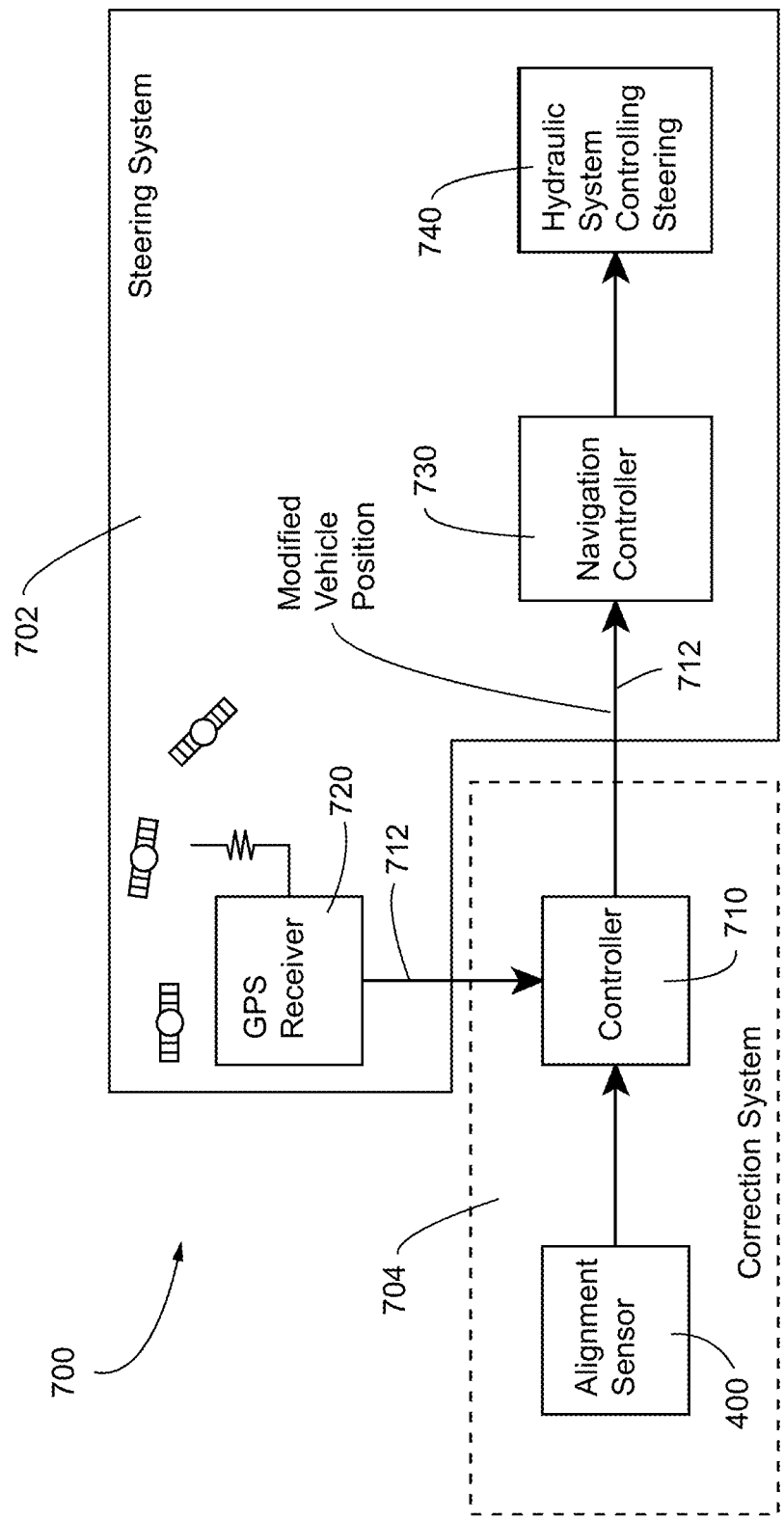
FIG. 6 is a block diagram illustrating one embodiment of a steering control system.

FIG. 6 is a block diagram of one embodiment of the enhanced steering system 700. As previously identified, the enhanced steering system 700 includes a correction system 704 which communicates with the vehicle's on-board steering system 702. The correction system 704 includes a controller 710 which receives the output signals from the position sensors 414, 416 of the alignment sensor 400. Generally speaking, the controller 710 utilizes the signals generated by the alignment sensor 400 (which correlates to the centerline of the crop rows or to the proximity to the crop rows), receives the GPS data from a GPS receiver 720 transmitted on a CAN (Controller Area Network) which includes the vehicle position information (latitude, longitude, and heading), and generates a modified position signal. The controller 710 then communicates the modified position signal via a CAN bus 712 to a navigation controller 730 of the vehicle's on-board steering system 702. It should be noted that all other bus data produced by the GPS receiver 720 are not modified and are simply sent to all subsequent systems (i.e., sent to navigation controller 730). As will be further discussed below, controller 710 and the alignment sensor 400 cooperate with one another to as part of the correction system 704, to cause adjustments to vehicle steering based upon the proximity to the rows.

Those skilled in the art will recognize that the navigation controller 730 is part of the on-board steering system 702, and is configured to provide appropriate signals to a steering control system 740, so that appropriate steering of the vehicle is achieved (i.e., autosteer). The inclusion of the controller 710 as outlined above, can be referred to as a "the man in the middle" approach, since GPS receiver 720 and navigation controller 730 cannot detect the presence of controller 710 on the CAN bus 712 and cannot detect that it is receiving a modified signal. In other words, the components of the automated steering system 702 operate in the same manner as if the controller 710 is not present.

Generally speaking, this embodiment of the enhanced steering system 700 allows the vehicle 12 to be steered by the automated steering system 702, and the measurement to the centerline between crop rows or proximity to a crop row to the alignment sensor 400 is used to shift or modify the GPS data to steer the vehicle based on said modified GPS data (i.e., the modified vehicle position signal). It is contemplated that some steering systems 702 may use serial communication instead of CAN messages. In such systems, the basic "man in the middle" approach can be achieved in a similar manner, however the modified position signals from the controller 710 are modified to accommodate communication protocols.

Again, when operating equipment in growing crops, the operator is attempting to reducing or eliminating crop damage due to plant contact with the tires and to keep the drop assemblies positioned substantially equally between the crop rows. To achieve these objectives, most auto guidance control systems or automated steering systems work by attempting to steer the equipment down a predefined target path (sometimes referred to as an "A-B" line). Target path guidance cannot account for variation in the rows due to equipment malfunction, planter drift, inaccuracy of GPS systems during planting, etc. Further, during navigation the accuracy of the GPS receivers is often not adequate to navigate the equipment down the row or along the target path within a margin of acceptable error. By incorporating an alignment sensor 400 (whether a tactile sensor 400A or non-contact sensor 400B) into the system, row variations can be accounted for by measuring proximity to the rows with high enough accuracy to avoid plant damage.

As mentioned above, the illustrated embodiments make use of preexisting GPS-based auto steering systems 702 on the vehicle 12. The use of an alignment sensor 400 is dependent upon the presence of crop rows immediately adjacent to the sensor to measure or detect the centerline between the adjacent crop rows and the subsequent modification or correction of the GPS data accordingly. One specific advantage of this approach is that original equipment manufacturer (OEM) or aftermarket steering control systems can still be used. Further, additional enhancements and features of these steering systems are still available to operators, such as row finding functions, automated end of row operations etc.

As discussed above, the row proximity measurements are carried out by the alignment sensor 400. To enhance operation, in embodiments utilizing a tactile sensor 400A, the raw sensor signal data (e.g., voltage) is collected from first position sensor 414 and second position sensor 416 and is run through a complex Kalman filter at a very high sample rate. Next, a smoothing rolling average is taken, giving a final proximity measurement in inches. This can then be used by controller 710 to further enhance operation.

Referring again to FIG. 6, one embodiment of the enhanced steering system 700 will be further understood when more details of all signals are discussed. As shown, the GPS signal on CAN 712 is intercepted by controller 710. More specifically, the latitude/longitude, speed, and heading are read by controller 710, while all other GPS and globe data are passed through to the navigation controller 730. When the offset from the centerline of the crop row is calculated, based upon data from the alignment sensor 400, the latitude/longitude signals are shifted (either left or right, based on the heading) to zero-out or approximately zero-out the offset, i.e., reduce the offset to zero or approximately zero inches. This shifted or modified vehicle position signal is then sent to the navigation controller 730, and steering control system 740 of the steering system 702. In this approach, the steering controller 740 is not aware that anything is abnormal, and is purely reactive to the received data. The difference is that the latitude and longitude are slightly adjusted by up to several inches (a max of 15 inches may be a reasonable limit for some systems, but other limits are clearly contemplated depending on the application) which causes the steering controller 740 to react to the physical position of the machine in comparison to the crop row, instead of only the A-B line.

As outlined above, the enhanced steering system 700 uses a combination of signals from GPS receiver 720 and tactile sensors 400A. The on-board automated steering system 702, including both OEM and after-market systems, does not need any more software or unlocks, etc. for effective operation. Rather, it purely will receive a modified GPS signal in a format that it expects to see. As discussed above, measurements are adjusted however to give the true position of the machine in comparison to the crop row, instead of just the position of the machine in comparison to the A-B line. Those skilled in the art will recognize that this allows for the continued use of OEM proven steering controllers, including all features and improvements contained therein. Several of these OEM systems have been proven to work well, to make a more intelligent and more accurate adjustments, thus allowing the wheels to be kept between the rows of the crop, instead of simply following the A-B line. Also, the fact that there is no need to replace the OEM steering controller, allows for the price of this enhanced system to be kept much lower. This also allows for OEM functionalities to continue such as GPS mapping, and row seeking on the end of a row, etc.

Figure 7:
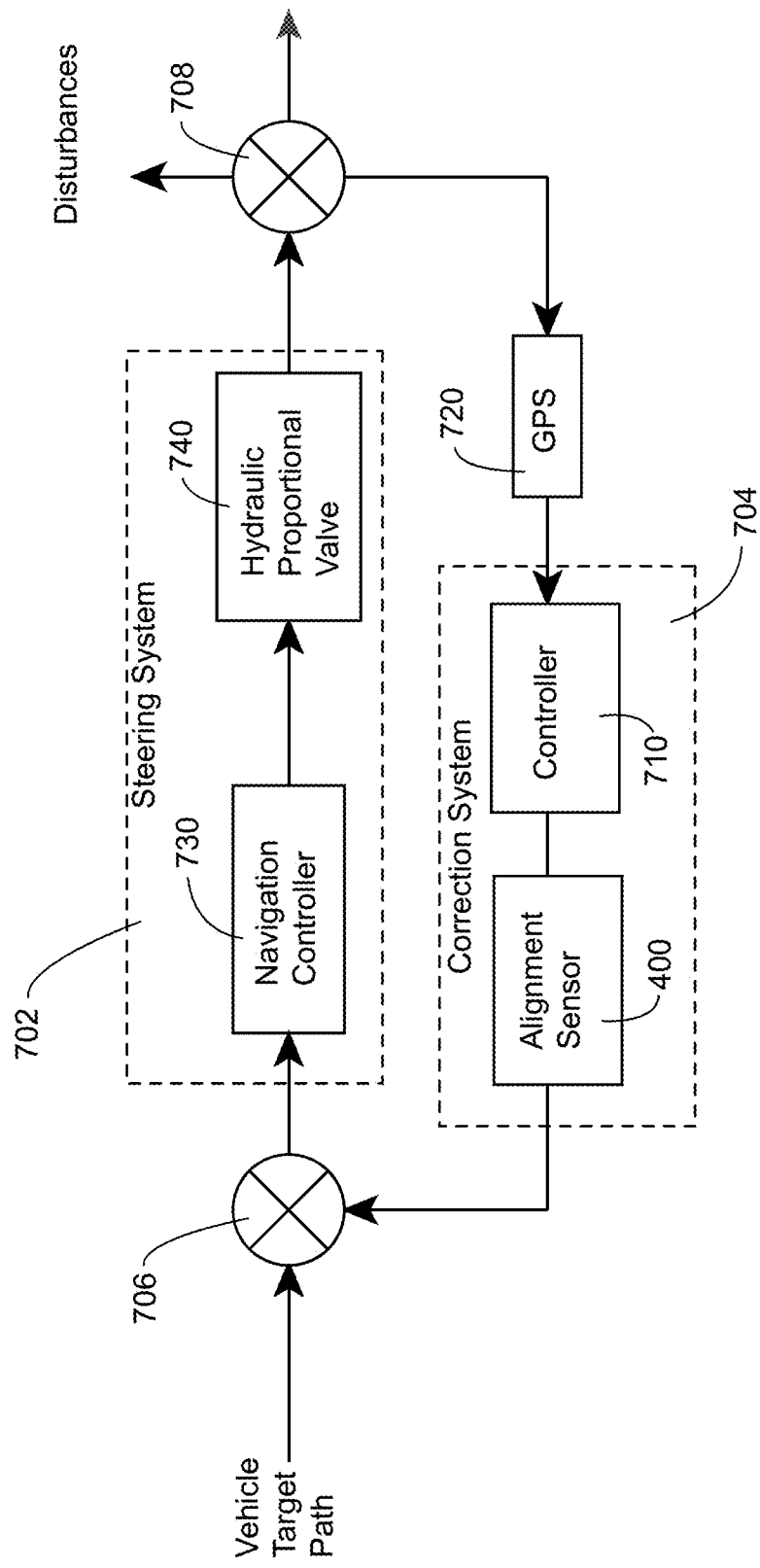
FIG. 7 is a control diagram of the steering control system of FIG. 6.

The overall control methodology for enhanced steering system 700 was generally described above in relation to FIG. 6. Turning now to FIG. 7, a closed loop control diagram is presented, which outlines the actual control strategy. As illustrated, a vehicle positioned target path is provided by the operator based upon the desired operation. Stated differently, the operator will input the desired target path or A-B line to be followed. This input is thus provided to first summing point 706, with the subsequent output being provided to the navigation controller 730. As discussed above, navigation controller 730 utilizes the position signal as an input and provides subsequent control signals to the hydraulic steering system controller 740. It should be appreciated that the steering controller 740 includes a hydraulic proportional valve used to provide steering command. The output from steering controller 740 is then provided to second summing point 708. Summing point 708 will provide the desired steering output for the carrier 12. Movement of carrier 12 in response to steering commands will be detected by GPS receiver 720. Similar to the discussion in connection with FIG. 6 above, the output of GPS receiver 720 is then provided to the correction system 704, made up of the controller 710 and the alignment sensor 400, which determines if the vehicle position is offset from the midpoint or centerline between the crop row. This offset distance is used to adjust the GPS input resulting in a modified vehicle position signal. This modified vehicle position signal is fed back into summing block 706 to compare the offset to the target path. Navigation controller 730 will receive the modified vehicle position signal to correct the course of the vehicle.

Figure 8A:
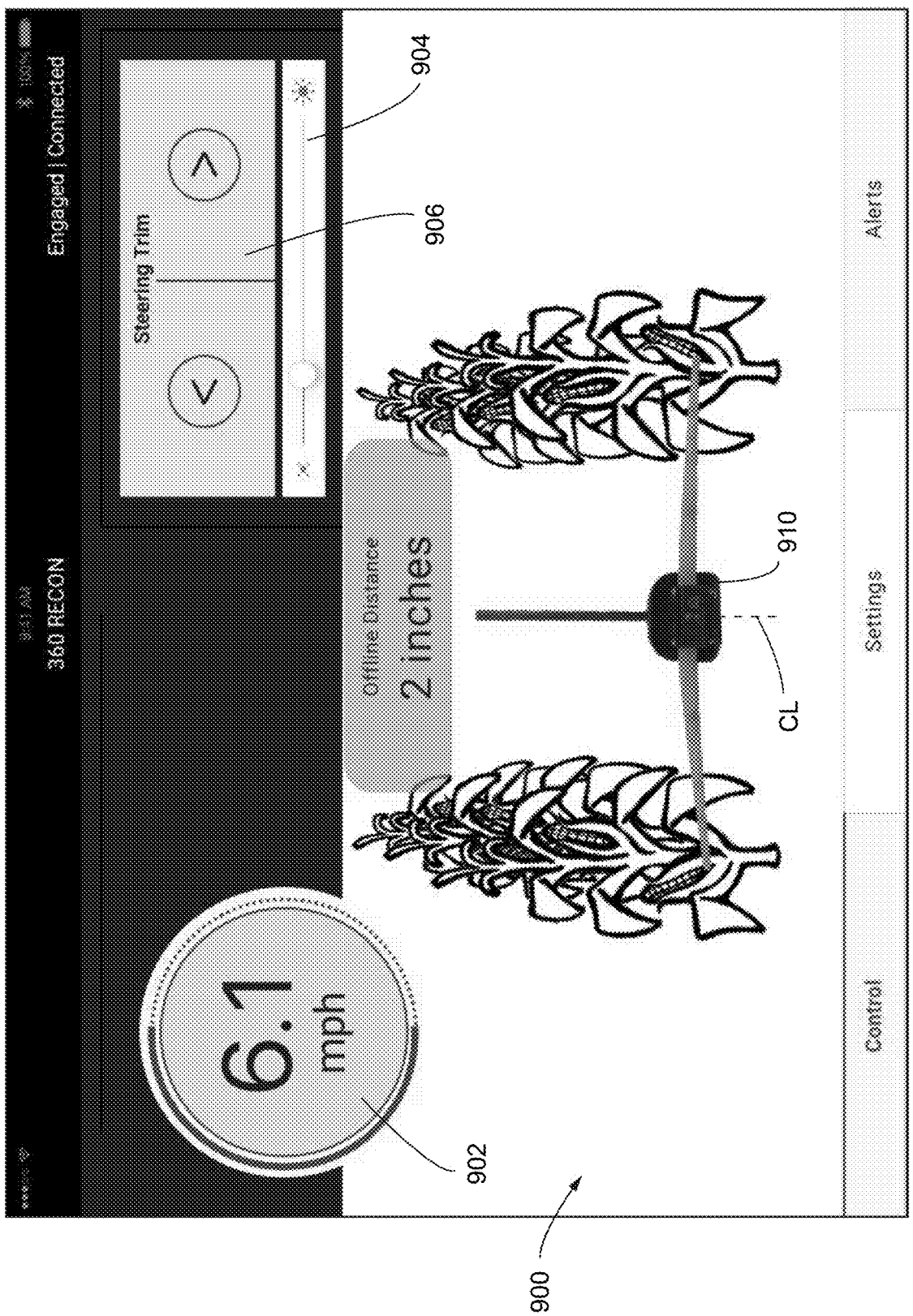
FIG. 8A is an illustrative example of a display screen of a display monitor.
Figure 8B:
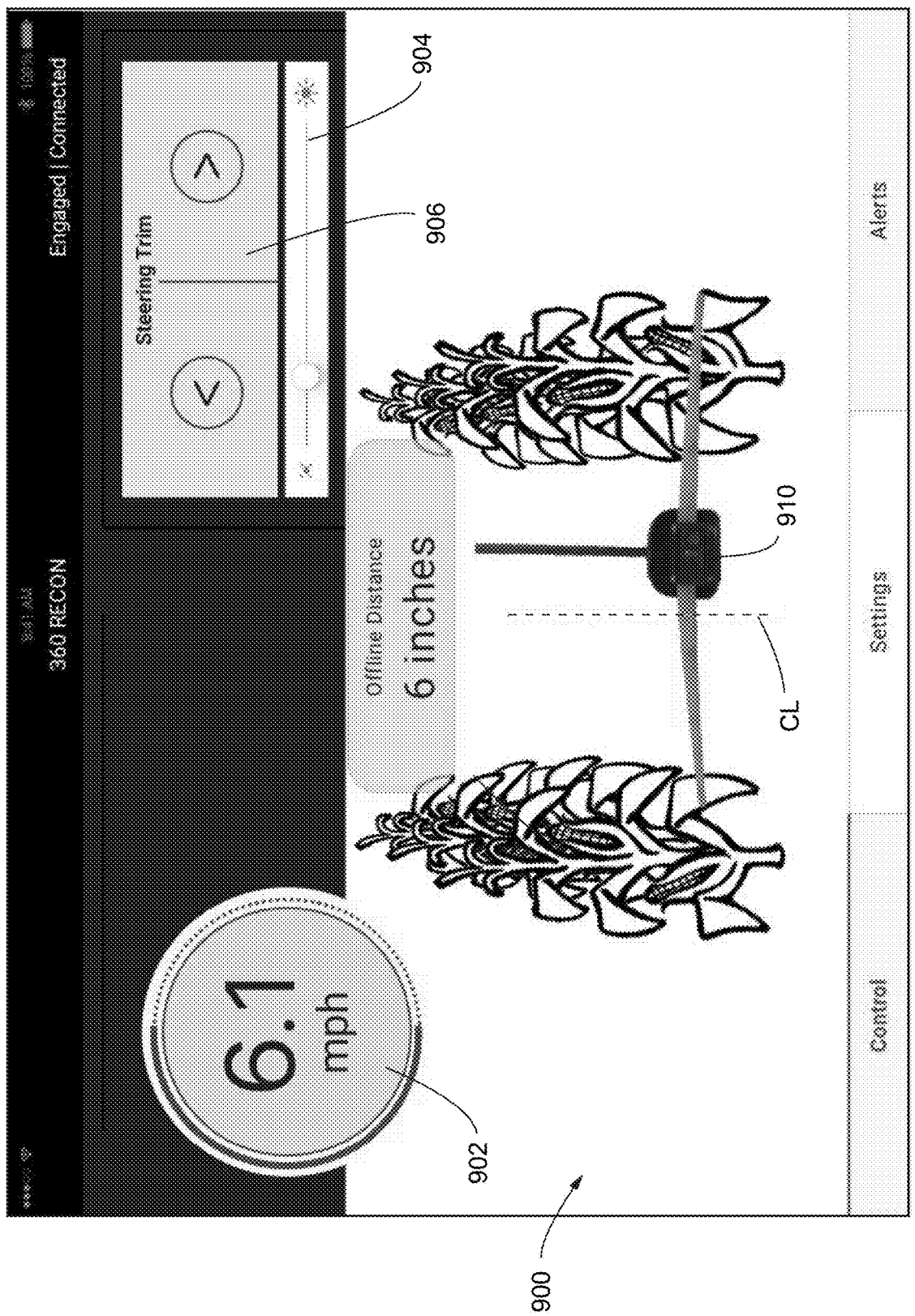
FIG. 8B is another illustrative example of a display screen of a display monitor.

In order to provide appropriate feedback and notifications to an operator, it is contemplated that enhanced steering system 700 of the various embodiments discussed above will include a display panel 900 capable of communicating valuable information. Examples of a display panel 900 are illustrated in FIGS. 8A and 8B. Although variations could be included, the contemplated display panel 900 includes multiple display fields which will be beneficial to the operator. Firstly, a speed indicator 902 may be included to provide the operator with speed information. Also, display controls, including an intensity controller 904 may be included to allow the user to modify display settings. In addition, steering trim adjustments 906 may be provided to the user, thus allowing for adjustment. Naturally, various other utility and informational settings can be included depending on the needs and desire of the operator.

Turning now to the tactile sensor image 910 on the display panel 900, valuable information regarding the operation of the enhanced steering system 700 is communicated to the operator. In this portion of display 900 tactile sensor image 910 is shown, in conjunction with the graphical illustration of a pair of corn rows. As apparent when comparing FIGS. 8A and 8B, this portion of display 900 may indicate the offset distance measured by the alignment sensor 400 in relation to the actual center line (CL) between crop rows. In the contemplated display, operation of the system is presented to the operator, which provides an indication of any adjustments being made, and whether appropriate steering operations are being executed.

Figure 11:
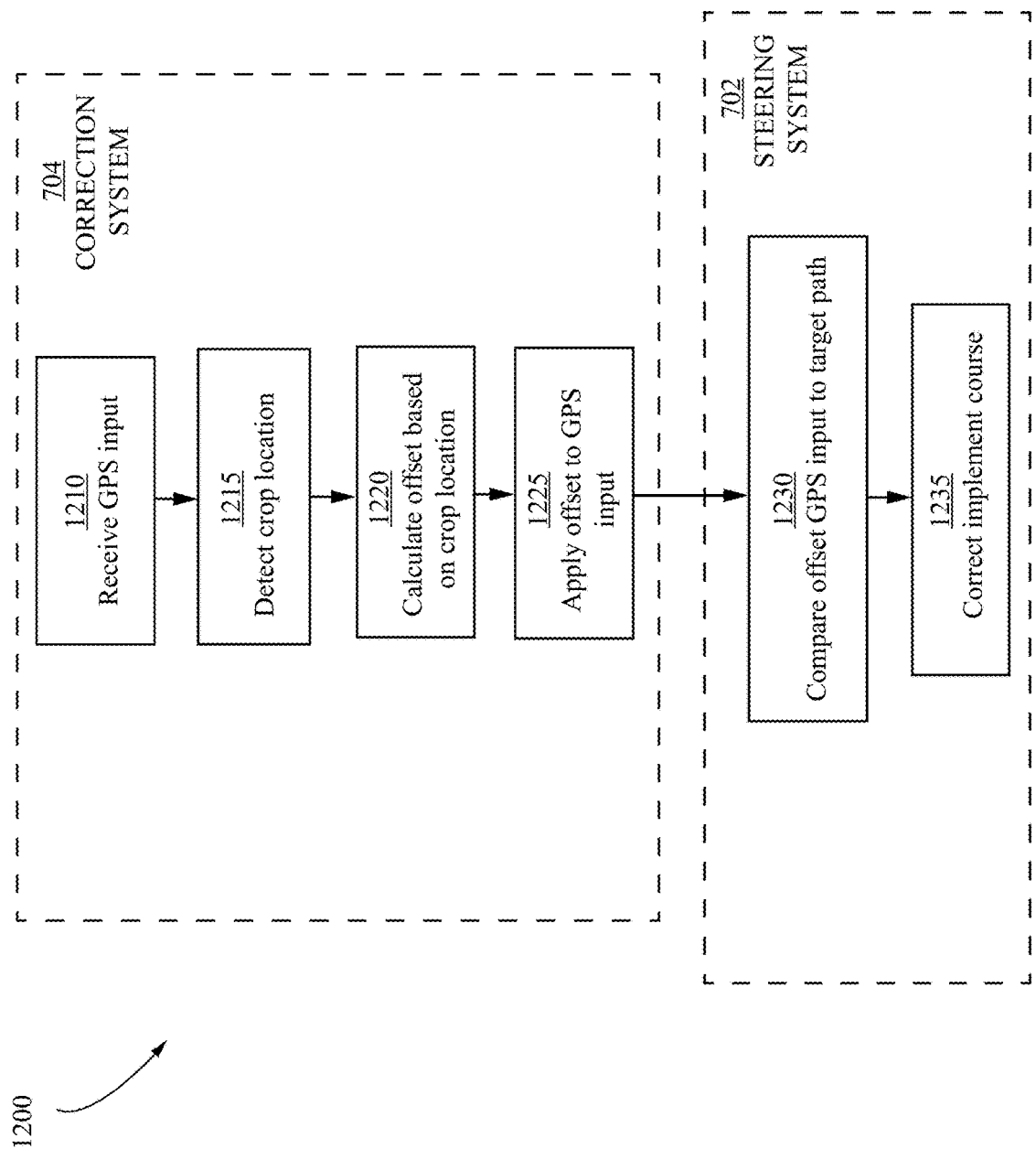
FIG. 11 is a flow diagram illustrating a method of steering a vehicle with the steering control system illustrated in FIGS. 6 and 7.

FIG. 11 illustrates a flow chart of a method 1200 for steering a vehicle and/or applying a correction to a steering system of the embodiments of FIGS. 6 and 7. Although the method 1200 is described herein with respect to the correction system 704 and steering system 702, in various embodiments and implementations, the method 1200 and alternative embodiments thereof may be carried out by different systems and/or subsystems as would be recognized by those of skill in the art.

At step 1210 the correction system 704 receives a GPS input (e.g., from GPS receiver 720). At step 1215, the correction system 704 detects a crop location using the alignment sensor 400, which may be performed by the tactile sensor 400A or the non-contact sensor 400B as previously described. For example, in embodiments utilizing a tactile sensor 400A, the detection of the crop location may be carried out by physically contacting a crop segment (e.g., crop stalk) with one of the wands or feelers 410, 412 deforming, displacing or otherwise rotating upon contact with the crop segment). In some embodiments, the crop location detected at step 1215 is a relative location indicating the distance of a crop from a component (e.g., sensor support, liquid applicator, liquid applicator base, etc.) supported on the implement. In embodiments utilizing a non-contact sensor 400B, step 1215 is carried out by determining the location of a crop and/or crop segment with a non-contact sensor (e.g., optical sensor, camera, ultrasonic sensor, thermal sensor, reflectivity sensor, etc.).

At step 1220, the correction system 704 calculates an offset based on the detected crop location. For example, in some embodiments an expected crop location is compared to the detected crop location in order to calculate the offset. In some embodiments such as those involving a tactile input used to determine the crop location, the expected crop location corresponds to an undeflected tactile sensor position and/or to an tactile sensor input when the tactile sensor is disposed symmetrically between rows of crop. In one example, if the crop is one inch farther from the sensor along a first direction than expected, then the correction system calculates an offset of one inch along the first direction, or in some embodiments along a second direction opposite the first direction.

At step 1225, the correction system 704 applies the calculated offset to the received GPS input and transmits or communicates the resulting offset GPS input to the automated steering system 702. At step 1230, the steering system 702 compares the offset GPS input provided by the correction system 704 to a target path (e.g., an A-B line or other line selected or otherwise input by the operator). At step 1235, the steering system 702 corrects the implement course, e.g., by adjusting an operating criterion of a valve or other hydraulic component of the self-propelled vehicle, or the vehicle used to tow the implement.

Figure 9:
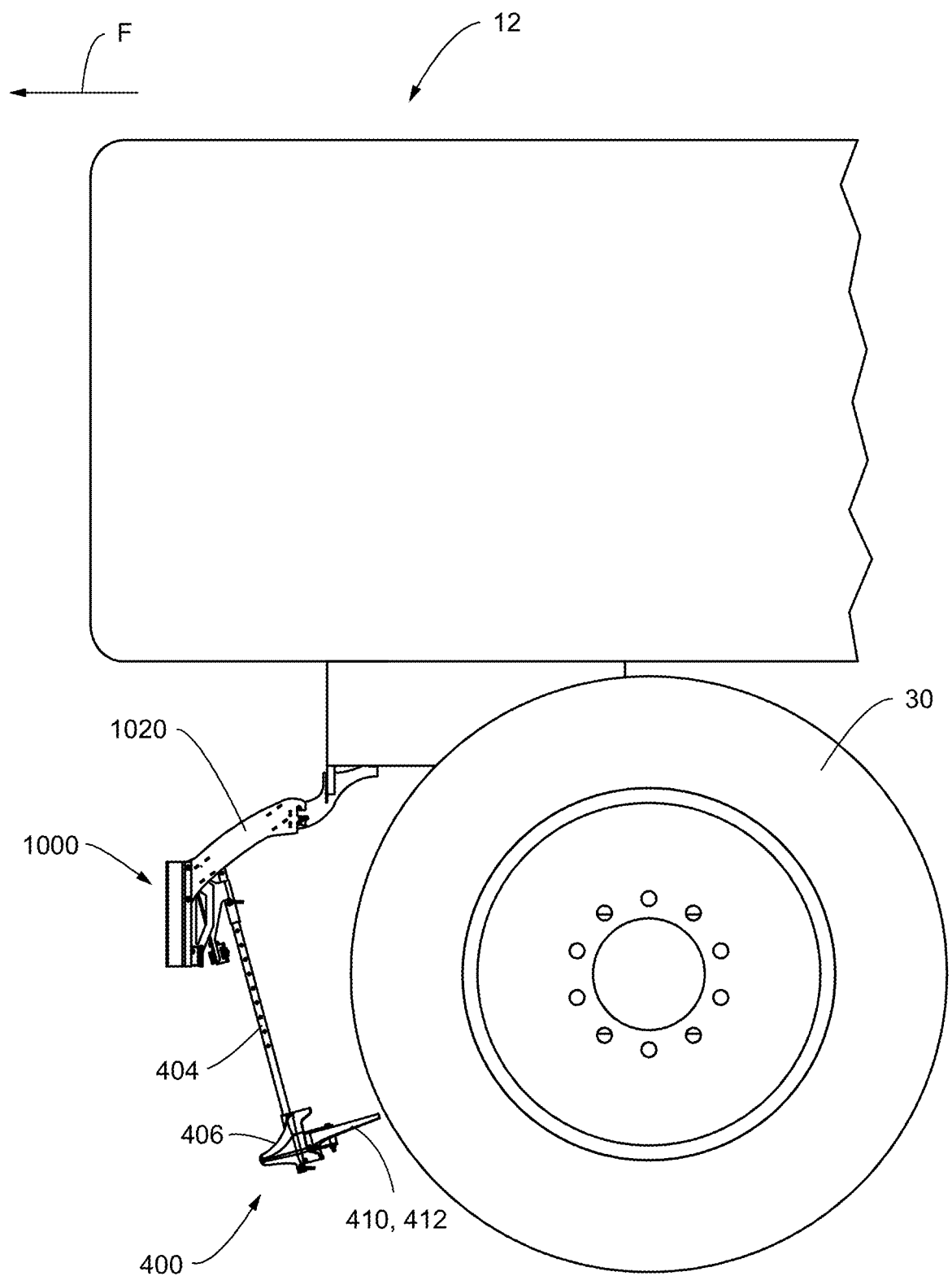
FIG. 9 is a side elevation view of an embodiment of a break-away mounting assembly for an alignment sensor disposed on a vehicle
Figure 9A:
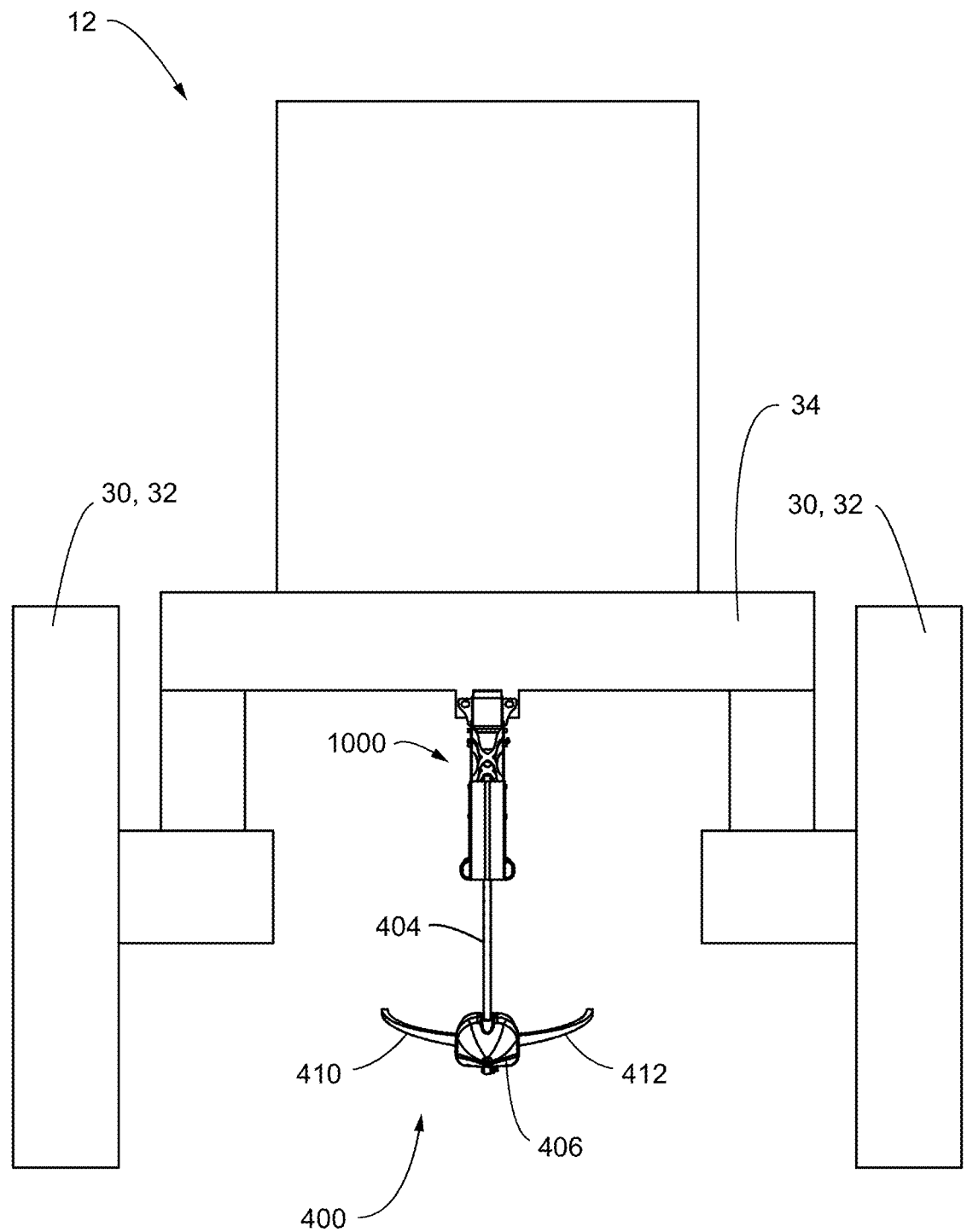
FIG. 9A is a front elevation view of the break-away mounting assembly of FIG. 9.

Referring to FIGS. 9 and 9A, an alignment sensor 400 (such as the tactile sensor 400A as illustrated in FIGS. 3-5) is shown supported on a vehicle 12 utilizing a break-away mounting assembly 1000 that allows the alignment sensor 400 to pivot or rotate rearwardly (i.e., opposite the forward direction of travel F) as indicated by arrow 1011 to avoid breakage, bending or other damage to the support rod 404, housing 406 or wands 410, 412 or other components of the alignment sensor 400, in the event the alignment sensor 400 encounters an obstruction in the field, such as a rock, ravine or dense vegetation, as the vehicle 12 advances through the field. Once the obstruction is passed, the break-away mounting assembly 1000 allows the alignment sensor 400 to pivot forwardly (i.e., toward the direction of travel F) as indicated by arrow 1011, by gravity or spring bias until it returns to its normal, substantially vertical, operating position.

It should be appreciated that the break-away mounting assembly 1000 may be mounted to the vehicle 12 in any desired location such that the support rod 404 of the alignment sensor 400 extends downwardly between two adjacently spaced crop rows. For example, the break-away mounting assembly 1000 may be mounted forward or rearward of either the front or rear wheel 30, 32 of the vehicle 12, or laterally between the front or rear wheels 30, 32 of the vehicle 12, or anywhere along the frame 34 or boom 16 of the vehicle 12.

In one embodiment, the break-away mounting assembly 1000 includes a stationary bracket 1010 and a pivoting bracket 1012. The pivoting bracket 1012 is pinned to the stationary bracket 1010 by a horizontal pivot pin 1014 such that the pivoting bracket 1012 is capable of pivoting with respect to the stationary bracket 1010 about the horizontal pivot pin 1014 in the direction of arrow 1011. The upper end of the support rod 404 of the alignment sensor 400 is secured to the pivoting bracket 1012.

The stationary bracket 1010 and the pivoting bracket 1012 may be retained in contact with one another, such as by magnetic force or by a spring bias force or both, such that the pivoting bracket 1012 is retained in its normal operating position until the alignment sensor 400 impacts or encounters an obstruction in the field with sufficient force or sufficient drag that the magnetic force or spring bias force is overcome, allowing the pivoting bracket 1012 to pivot rearwardly with respect to the stationary bracket 1010 about the horizontal pivot pin 1014. As previously described, once the obstruction is passed, the pivoting bracket 1012 will pivot forwardly (i.e, in the forward direction of travel) either by gravity or by a spring bias mechanism (not shown) until the pivoting bracket 1012 is in its normal operating position and magnetically coupled or biasingly engaged with the stationary bracket 1010.

In one such embodiment, a magnet 1016 may be disposed between the stationary bracket 1010 and the pivoting bracket 1012. It should be appreciated that if only one of the brackets 1010, 1012 has a magnet 1016 secured thereto, the other bracket 1010, 1012, or some aligned portion thereof, would be made of a magnetically attractive metal for providing the magnetic coupling between the brackets 1010, 1012. Alternatively, each of the brackets 1010, 1012 may include magnets 1016 secured thereto which are aligned with opposite magnetic poles to provide the magnetic coupling between the brackets 1010, 1012.

In an embodiment in which the pivoting bracket 1012 is biasingly engaged the normal operating position to the stationary bracket 1010, a coiled spring (not shown) may be secured at each of its ends to the respective stationary bracket 1010 and pivoting bracket 1012 to bias the pivoting bracket 1012 into contact with the stationary bracket 1010. Alternatively, a torsion spring (not shown) may be disposed around the horizontal pivot pin 1014 such that the torsion spring biases the pivoting bracket 1012 into contact with the stationary bracket 1010. Other spring bias arrangements or configurations may also be utilized as recognized and readily appreciated by those or ordinary skill in the art.

Figure 10:
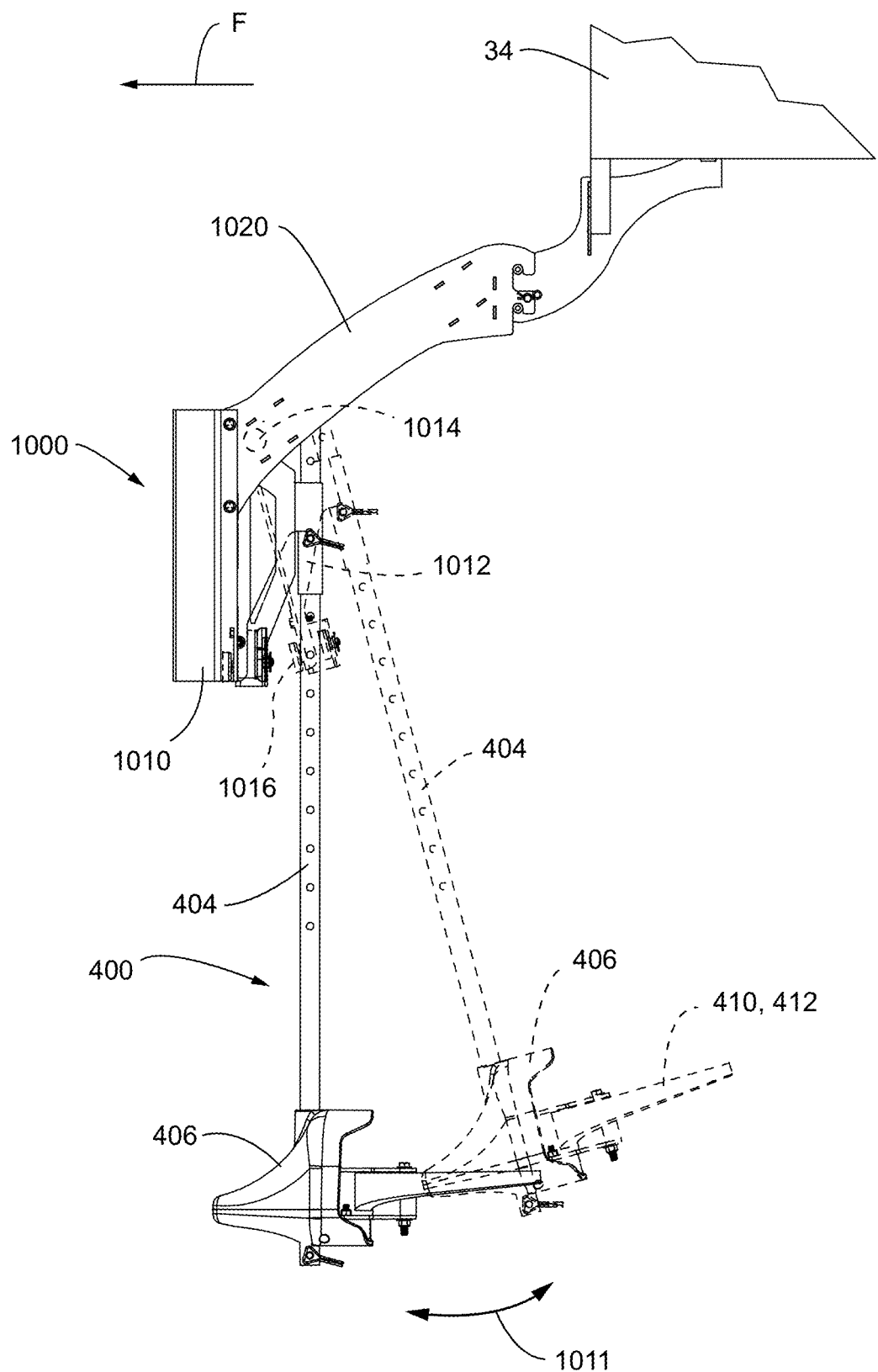
FIG. 10 is an enlarged view of the break-away mounting assembly of FIG. 9.

Depending on the mounting location and/or configuration of the vehicle 12, a mounting arm 1020 may be provided between the vehicle 12 and the break-away mounting assembly 1000 to avoid interference with the rearward and forward pivoting movement of the break-away mounting assembly 1000 and alignment sensor 400 supported thereby. For example, as shown in FIG. 10, the mounting arm 1020 may have a downwardly and forwardly curved configuration or any other desired or appropriate configuration, with appropriate mounting plates or other mounting arrangements to secure one end of the mounting arm 1020 to the vehicle frame 34 or other component of the vehicle 12, and the other end to the break-away mounting assembly 1000 (e.g., to the stationary bracket 1010) to ensure sufficient clearance of and/or to avoid interference with the rearward and forward pivoting movement of the break-away mounting assembly 1000 and alignment sensor 400 supported thereby.

Various modifications to the embodiments and the general principles and features of the apparatus, systems and methods described herein will be readily apparent to those of skill in the art. Thus, the foregoing disclosure is not to be limited to the embodiments of the apparatus, systems and methods described herein and illustrated in the drawing figures, and should be interpreted broadly to include all variations and modifications coming within the scope of the appended claims and their legal equivalents.

The invention claimed is:

1. A liquid applicator implement incorporating an automated steering system for steering the liquid applicator implement as it advances in a forward direction of travel through a field having laterally spaced row crops, the liquid applicator implement comprising:

(a) a plurality of drop assemblies supported by and spaced laterally along a boom structure, the boom structure disposed at a height above a soil surface and extending laterally in a direction transverse to the forward direction of travel, whereby each of the plurality of drop assemblies is positioned between two of the laterally spaced crop rows, each of the plurality of drop assemblies comprising:

(i) a riser extending downwardly from the boom structure toward the soil surface between the two laterally spaced crop rows;

(ii) a base unit supported at a lower portion of the riser, the base unit diverging laterally outward from a forward end toward a rearward end, the forward end oriented toward the forward direction of travel, the rearward end extending rearward from the forward end, the rearward end having a lateral width greater than a lateral width of the forward end;

(iii) a pair of dribble hoses extending from the rearward end of the base unit, the dribble hoses delivering liquid product from a liquid product source onto the soil surface proximately adjacent to a respective one of the two laterally spaced crop rows;

(b) a navigation controller;

(c) a steering control system responsive to said navigation controller;

(d) a Global Positioning System (GPS) receiver generating signals indicative of the liquid applicator implement's latitude and longitude position and heading as the liquid applicator implement advances in the forward direction of travel;

(e) a correction system including a controller and an alignment sensor, said controller in signal communication with said GPS receiver, said alignment sensor and said navigation controller;

wherein said alignment sensor is operably supported by the liquid applicator implement, said alignment sensor comprising:

(i) a support rod having a lower end extending downwardly from the liquid applicator implement toward the soil surface and between two of the laterally spaced crop rows;

(ii) a breakaway mounting assembly pivotally securing an upper end of the support rod to the liquid applicator implement, the breakaway mounting assembly including:

a stationary bracket attached to the liquid applicator implement, the stationary bracket having an upper end and a lower end extending downwardly from the upper end toward the soil surface;

a pivoting bracket having an upper end pivotally attached toward the upper end of the stationary bracket about a horizontal pivot axis oriented transverse to the forward direction of travel of the liquid applicator implement, the support rod secured to and supported by the pivoting bracket;

a magnet disposed between the lower end of the stationary bracket and a lower end of the pivoting bracket, the magnet having a magnetic force sufficient to maintain the lower end of the pivoting bracket in a normal operating position in which the lower end of the pivoting bracket is in magnetic engagement with the lower end of the stationary bracket until the lower end of the support rod encounters an obstruction that exerts a force sufficient to overcome the magnetic force, whereupon the pivoting bracket pivots rearwardly about the horizontal pivot axis to a breakaway position in which the lower end of the pivoting bracket is out of magnetic engagement with the lower end of the stationary bracket until the obstruction is passed, whereupon the pivoting bracket pivots forwardly about the horizontal pivot axis and returns to the normal operating position;

(iii) a sensor housing supported at the lower end of the support rod, the sensor housing diverging laterally outward from a forward end toward a rearward end, the forward end oriented toward the forward direction of travel, the rearward end extending rearward from the forward end, the rearward end having a lateral width greater than a lateral width of the forward end;

(iv) a first wand pivotally supported at a proximal end at the rearward end of the housing, a distal end of the first wand extending laterally outwardly from the housing a distance to engage a first one of the two laterally spaced crop rows;

(v) a second wand pivotally supported at a proximal end at the rearward end of the housing, a distal end of the second wand extending laterally outwardly from the housing a distance to engage a second one of the two laterally spaced crop rows;

(vi) a first position sensor including a first Hall-effect sensor and a first magnet, the first Hall-effect sensor supported by the housing and the first magnet carried by the pivotal first wand, the first position sensor generating a first output signal indicative of a degree of rotation of the first wand with respect to the housing as the liquid applicator implement advances in the forward direction of travel; and (vii) a second position sensor including a second Hall-effect sensor and a second magnet, the second Hall-effect sensor supported by the housing and the second magnet carried by the pivotal second wand, the second position sensor generating a second output signal indicative of a degree of rotation of the second wand with respect to the housing as the liquid applicator implement advances in the forward direction of travel; and wherein said controller receives said generated first and second output signals from said first and second position sensors and determines an offset distance of said alignment sensor from a centerline between the two laterally spaced crop rows;

wherein said controller outputs a modified position signal corresponding to said latitude and longitude position received from said GPS receiver shifted by said offset distance;

wherein said navigation controller causes said steering control system to steer the liquid applicator implement based on said modified position signal.

2. The liquid applicator implement of claim 1, wherein the liquid applicator implement is a self-propelled vehicle.

3. The liquid applicator implement of claim 1, wherein the liquid applicator implement is towed behind a tractor.

4. The liquid applicator implement of claim 1, further comprising a display monitor in signal communication with said GPS receiver and said controller, said display monitor having a display screen visible to an operator of the liquid applicator implement, said display screen visibly displaying to the operator said offset measurement in relation to the longitudinal centerline between the two adjacent crop rows.

\* \* \* \* \*